United States Patent [19]

Allard et al.

[11] Patent Number: 5,615,384

[45] Date of Patent: Mar. 25, 1997

[54] PERSONAL COMMUNICATOR HAVING IMPROVED ZOOM AND PAN FUNCTIONS FOR EDITING INFORMATION ON TOUCH SENSITIVE DISPLAY

[75] Inventors: David J. Allard; Francis J. Canova, Jr., both of Boynton Beach; Debra A. G. Johnson, Fort Lauderdale; Charles S. Lanier, Delray Beach; James R. Lewis, Coconut Creek; Byron K. Tiller, Boca Raton; William Villafana, Davie; Raymond L. Yee, Coral Springs, all of Fla.

[73] Assignee: International Business Machines Corporation, Armonk, N.Y.

[21] Appl. No.: 521,333

[22] Filed: Aug. 29, 1995

Related U.S. Application Data

[63] Continuation of Ser. No. 146,341, Nov. 1, 1993, abandoned.

[51] Int. Cl.$^6$ ........................................ G06F 15/66
[52] U.S. Cl. .................... 395/800; 395/139; 395/326; 382/298; 345/121; 345/130; 345/173
[58] Field of Search ........................... 395/800, 139, 395/157; 345/156, 173; 364/DIG. 1, 521, 518; 382/47, 8; 340/700, 731, 712

[56] References Cited

U.S. PATENT DOCUMENTS

| | | | |
|---|---|---|---|
| 4,587,630 | 5/1986 | Straton et al. | 364/DIG. 2 |
| 4,755,811 | 7/1988 | Slavin et al. | 340/731 |
| 4,790,028 | 12/1988 | Ramage | 382/47 |
| 4,833,625 | 5/1989 | Fisher et al. | 364/518 |
| 4,899,292 | 2/1990 | Montagna et al. | 364/521 |
| 5,051,927 | 9/1991 | Tada et al. | 364/521 |
| 5,119,079 | 6/1992 | Hube et al. | 340/712 |
| 5,119,135 | 6/1992 | Baldwin | 355/218 |
| 5,157,384 | 10/1992 | Greanias et al. | 340/706 |
| 5,166,666 | 11/1992 | Tanaka | 340/706 |
| 5,184,314 | 2/1993 | Kelly et al. | 364/709.01 |
| 5,187,776 | 2/1993 | Yanker | 395/157 |
| 5,201,034 | 4/1993 | Matsuura et al. | 395/155 |
| 5,204,813 | 4/1993 | Samph et al. | 364/419 |
| 5,252,951 | 10/1993 | Tannenbaum et al. | 345/156 |
| 5,260,697 | 11/1993 | Barrett et al. | 345/173 |
| 5,317,140 | 5/1994 | Dunthorn | 250/221 |
| 5,341,466 | 8/1994 | Perlin et al. | 395/139 |
| 5,353,356 | 10/1994 | Waugh et al. | 382/8 |
| 5,363,211 | 11/1994 | Hasebe et al. | 358/451 |

*Primary Examiner*—Alyssa H. Bowler
*Assistant Examiner*—Walter D. Davis
*Attorney, Agent, or Firm*—George E. Grosser

[57] ABSTRACT

A mobile, hand-held personal communicator includes a casing for housing a cellular phone, modem, and data processing system. Graphics image files are stored and can be selectively displayed on a touchscreen display. A zoom function magnifies areas of a graphics image, such as a fax image, that has been received and stored in the PC. When the zoom function is selected, the user touches the screen, and a magnification frame or window appears. When the user removes his/her finger, the area within the frame is magnified. The user can also drag the frame around the screen, while still touching the screen, to select a specific area to be magnified when the user releases the screen. A pan function allows the user to shift the image within a viewing area. The user can pan the image by touching the display at an initial touch point, and moving his/her finger keeping it in contact with the screen, to shift the touch point to a new touch point. Upon releasing the new touch point, the image is redrawn in a new position corresponding to the change in position between the initial and new touch points.

9 Claims, 5 Drawing Sheets

PERSONAL COMMUNICATOR HAVING IMPROVED ZOOM AND PAN FUNCTIONS FOR EDITING INFORMATION ON TOUCH SENSITIVE DISPLAY

The application is a continuation of application Ser. No. 08/146,341 filed Nov. 1, 1993, now abandoned.

RELATED APPLICATIONS

The following applications are all assigned to the assignee of this invention, and cover different inventions arising out of a common development project:

(1) Application Ser. No. 07/976,127, filed Nov. 13, 1992, for "NAVIGATOR APPLICATION FOR PERSONAL COMMUNICATOR", by B. A. Beatty et al.

(2) Application Ser. No. 08/146,342, filed concurrently herewith, for "PERSONAL COMMUNICATOR HAVING IMPROVED CONTRAST CONTROL FOR TOUCH SENSITIVE DISPLAY", by D. J. Allard et al.

(3) Application Ser. No. 08/145,914, filed concurrently herewith, for "PERSONAL COMMUNICATOR HAVING COLLAPSIBLE KEYBOARD FOR EDITING DOCUMENTS ON TOUCH SENSITIVE DISPLAY", by D. J. Allard et al.

The above related application (1) deals primarily with an operating system extension called the "Navigator", which manages screen displays and controls switching between different communication and data processing functions. Related application (2) deals with an improved contrast control for a touch sensitive display. Related application (3) deals with managing a relatively small touch sensitive display in which a simulated collapsible keyboard is used to edit/enter information in a data viewing area. The present application deals with managing the data presented on the screen of on a relatively small touch sensitive display and providing novel pan and zoom functions for viewing portions of a relatively large image.

BACKGROUND OF THE INVENTION

The invention was designed as part of a personal communicator that combines a cellular phone, data and fax modem, and a data processing system, into a mobile, compact, lightweight, battery operated, handheld device having a variety of data processing and communication functions. These functions include operating the device as a standard cellular phone; a calendar showing a list of things to do at various times; an address book for organizing names, addresses and phone numbers; an editor allowing text entry and editing; a calculator; and a communication device for fax, E-mail and various data bases and services.

The personal communicator is in the form of a handset having an earphone or speaker at one end and a microphone at the other end. The speaker and microphone are spaced apart the same distance as the distance between an ear and the mouth of an "average" user, to facilitate use of the communicator as a cellular phone. A small touchscreen display is located between the speaker and the microphone. The display has a fine pitch liquid crystal display (LCD) allowing it to be operated as a standard CGA with a resolution of 640×200 pixels. The touch sensitive display provides a graphic user interface and is used as an input/output device for a variety of functions or applications.

Within the prior art, particularly that of desktop personal computers, it is publicly known to control pan and zoom functions on graphic images by positioning a cursor with the aid of a cursor control device such as a keyboard, mouse, trackball, pen, etc. With a mouse controlled screen, a common zoom function is to click at one corner of the area to be magnified, and drag the mouse to another corner. Upon release, the delineated area is magnified. Panning is done by moving the cursor against the edge of a screen image. U.S. Pat. No. 5,187,776- Yanker discloses an "IMAGE EDITOR ZOOM FUNCTION" for a personal computer CRT display, in which a small viewport window shows an image at a (1×) magnification. The viewport is superimposed on a larger display of a magnified portion of the image centered about the location of the cursor in the viewport. The cursor is also movable in the viewport to pan the magnified image.

U.S. Pat. No. 4,899,292- Montagan et al, discloses a "SYSTEM FOR STORING AND RETRIEVING TEST AND ASSOCIATED GRAPHICS". The system includes a computer coupled to a terminal having a resistive touch-screen. A wand is connected to an analog to digital converter. When the wand is touched to the screen, it detects a voltage signal that is converted into coordinates. The image is magnified by two centered at the point of touch.

SUMMARY OF THE INVENTION

One of the objects of the invention is to provide improved zoom and pan functions for a mobile, handheld personal communicator having a small touchscreen display actuated in response to being touched by a user's finger.

Another object of the invention is to provide a novel and improved means for selecting areas of a touchscreen graphic image to be panned or magnified, without requiring the use of a pointer device such as a trackball, pen or mouse.

A further object of the invention is to provide a personal communicator in which graphic images are stored for display on a finger operated touchscreen display, and a displayed image can be zoomed by touching the display whereby a frame appears delineating the area to be magnified, the frame being dragged by sliding the finger across the display, until the frame indicate the area the user wants magnified.

Briefly, in accordance with the invention, a zoom function is used to magnify areas of a graphics image, such as a fax image, that has been received and stored in the PC. When the zoom function is selected, the user touches the screen, and a magnification frame or window appears. When the user removes his/her finger, the area within the frame is magnified. The user can also drag the frame around the screen, while still touching the screen, to select a specific area to be magnified when the user releases the screen.

When the pan function is selected, the entire screen acts as a window or mask over the image. The image thus appears as a sheet of paper behind the screen. The user can then press the screen anywhere at an initial touch point, and move his/her finger keeping it in contact with the screen, to shift the touch point to a new touch point. Upon releasing the new touch point, the image is redrawn in a new position corresponding to the change in position between the initial and new touch points.

DRAWINGS

Other objects and advantages of the invention will be apparent from the following description taken in connection with the accompanying drawings wherein.

DETAILED DESCRIPTION

General System Organization

Figure 1:
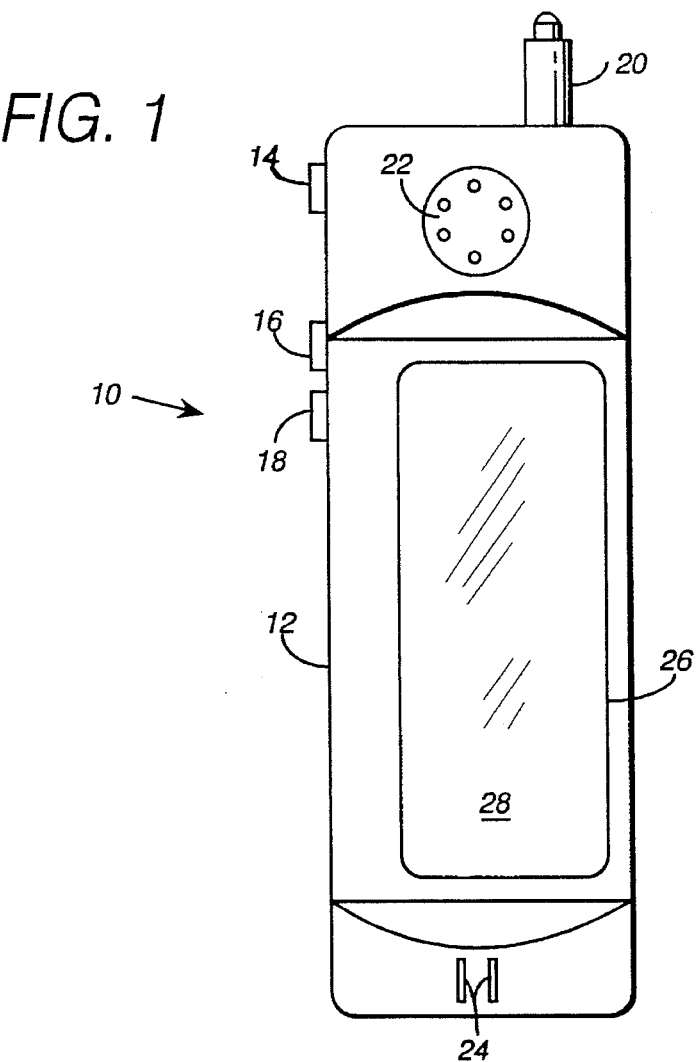
FIG. 1 is a plan view of a personal communicator embodying the invention.

Referring now to the drawings, and first to FIG. 1, a personal communicator (PC) 10 is of the type generally set forth above and comprises a cellular phone and a complete data processing system further details of which are described below. PC 10 includes a housing or casing 12 having mounted along one side thereof a plurality of external, manually operated push buttons including an ON/OFF push button 14, an UP push button 16, and a DOWN push button 18. PC 10 has a size facilitating usage as a hand-held device and buttons 16 and 18 are located so that a right handed user can wrap his/her fingers around the rear of the casing and actuate the buttons to adjust speaker volume while the user is listening to the phone speaker. A pull-out antenna 20 is mounted at the top of the casing. A speaker 22 is mounted near the top of the casing and a microphone 44 (FIG. 2) is mounted inside the bottom of the casing behind port holes 24. A touchscreen display 26 is mounted on the middle portion of the casing between the speaker and the microphone, and provides an input/output (I/O) device and user interface for entering information into and receiving information, from the PC and the data processing system therein. The general shape of PC 10 is similar to the shape of commercially available portable phones except that display 26 occupies the space normally used for a standard, electromechanical, twelve push-buttons, phone Keyboard- Display 26 includes a touch sensitive overlay 28 the outer surface of which is flush with adjacent portions of casing 12.

Figure 2:
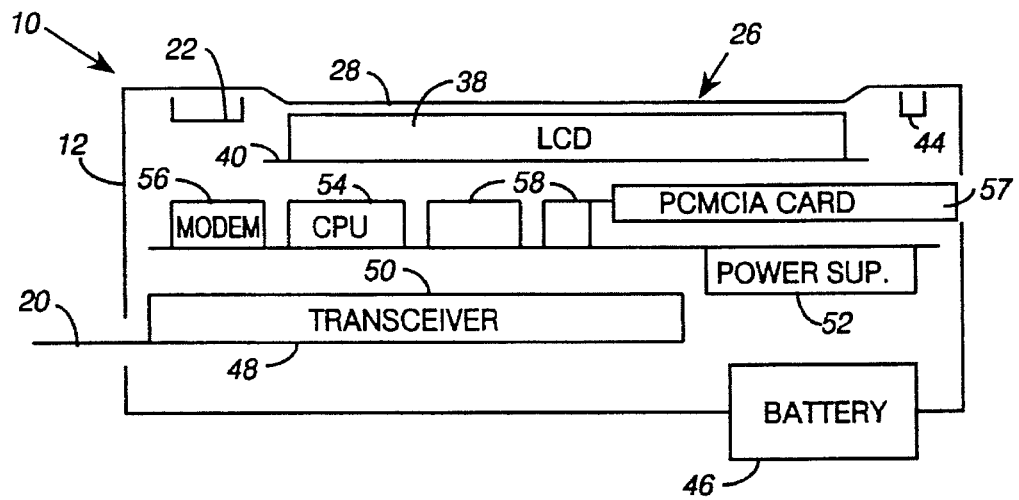
FIG. 2 is a longitudinal view through the personal communicator shown in FIG. 1, schematically illustrating various components.

Referring to FIG. 2, PC 10 has a plurality of miniaturized components mounted within casing 12. The components include speaker 22 and microphone 44 spaced apart a distance corresponding to the distance between an ear and the mouth of an average size user to facilitate use as a phone. PC 10 is battery operated and includes a battery 46 detachably mounted on the back wall of the casing. A cellular phone transceiver 48 is mounted inside casing 12 and is connected to antenna 20, the antennal being extensible outwardly from the casing for radio frequency (RF) communications. Display 26 is rectangularly shaped and comprises a touch sensitive overlay 28 that overlies a liquid crystal display (LCD) 38, and a backlight 40. The LCD has a viewing area of 36 mm by 115 mm and is operated as an all points addressable display. A planar card 50 is mounted within the center of casing 12 and has mounted thereon various components including a power supply 52, a central processing unit (CPU) 54 that forms the system controller (FIG. 3), a modem 56, and other components 58 including a connector for connecting and supporting an optional Personal Computer Memory Card International Association (PCMCIA) card 57 that conforms to published standards of the Association for a version 2.0 card support.

Figure 3:
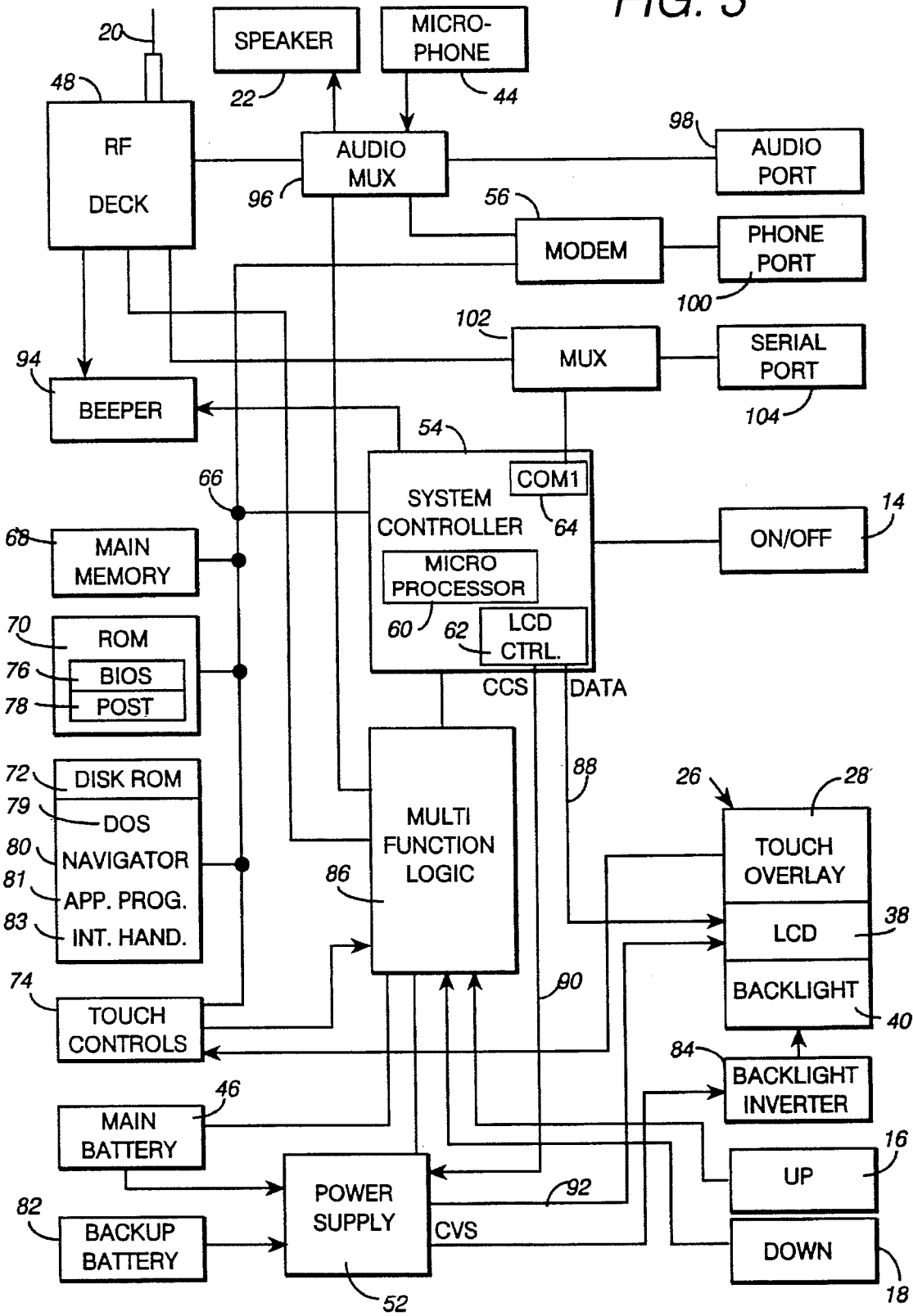
FIG. 3 is a is a block diagram of electrical components of the personal communicator shown in FIG. 1.

Referring to FIG. 3, system controller 54 is single chip implementation of a PC/XT class portable computer, the chip being a Model VG230 processor commercially available from Vadem, Inc., San Jose, Calif. Controller 54 comprises a plurality of subsystems including a microprocessor 60 for executing various programs stored in the communicator, an LCD controller 62, a COM1 communication port 64, and pinouts for connection to various devices the major ones of which are shown in FIG. 3. A bus 66 interconnects controller 54 with a main memory 68, a read only memory (ROM) 70, a disk ROM 72, touch controls 74, and modem 56.

ROM 70 stores a basic input/output system (BIOS) 76 and a power on self test (POST) program 78, and is accessed in the usual manner. Disk ROM 72, however, is accessed, in a manner that simulates a disk drive, and stores files containing a disk operating system (DOS) 79, the Navigator program 80 which is an extension to the DOS, application programs 81 that produce various communication and data processing functions in PC 10, and interrupt handlers 83 for handling interrupts specific to the applications. Additional memory and application programs can be added by the PCMCIA card. When the communicator is turned on, POST program 78 is executed. In response to a successful completion of the test, a kernel of DOS 79 is then loaded from disk ROM 72 into main memory 68, for execution. DOS 79 accesses disk ROM 72 and loads the Navigator and the application programs, as needed, into main memory 68 for execution by microprocessor 60. The Navigator controls the information displayed on the LCD, paints the various screens associated with the application programs on the LCD, and spawns new programs in response to user selection through actuation of the touchscreen interface.

Communication functions are handled by RF deck 48 and modem 56. RF deck is connected to a beeper 94 that is sounded or actuated to alert the user to an incoming call. Controller 54 is also connected to beeper 94 and is able to selectively actuate the beeper such as when a screen button is selected. Deck 48 is also connected to an audio mux 96 which controls the routing of audio signals between deck 48, speaker 22, microphone 44, modem 56, and audio port 98. Modem 56 is connected to a phone port 100 by means of which PC 10 can be connected by a cable (not shown) into a phone network or system. Deck 48 is also connected to a mux 102 that in turn is connected further to a serial port 104 and to COM1 port 64 of controller 54.

Battery 46 is connected to power supply 52 and supplies the primary power for operating PC 10. A backup battery 82 is also connected to the power supply and supplies power to volatile memory when the main battery is removed for replacement. Power supply 52 is connected to a backlight inverter 84 that, in turn, is connected to backlight 40 for controlling back lighting of the LCD to allow PC 10 to be operated under low light conditions. PC 10 preferably includes power management functions (not shown) for conserving energy usage and prolonging battery life.

LCD controller 62 is connected by a data bus 88 to supply data to LCD 38 to control the contents of the information displayed by the LCD. Controller 62 drives a contrast control signal (CCS) onto line 90 for transmission to power supply 52. In response to the CCS, power supply 52, drives a contrast voltage signal (CVS) onto line 92 that determines the contrast of LCD 38.

Touch overlay 28 is a resistive pressure sensitive overlay that produces an analog voltage signal indicative of an overlay location being pressed. Overlay 28 is connected to touch controls 74 that convert the analog signal into a digital signal representing the X, Y coordinates of the overlay location being pressed. The digital coordinates are then transmitted over bus 66 to controller 54 and memory 68 for use in determining the purpose of the location being pressed. Touch controls 74 are further connected to multifunction logic 86. In response to sensing that the overlay 28 has been touched, controls 74 generate an interrupt request that is transmitted to logic 86 and logic 86 then transmits the interrupt request to controller 54. UP and DOWN buttons 16 and 18 are also connected to logic 86 which debounces any signals due to the mechanical nature and generates a button number identifying which button has been pressed. The numbers are stored in I/O ports (not shown) which can be polled by the system. Multifunction logic 86 is also connected to RF deck 48 and audio mux 96 allowing controller 54 to communicate therewith and provide functions not done by the system controller, such functions not being germane to the invention.

Operation

Figure 4:
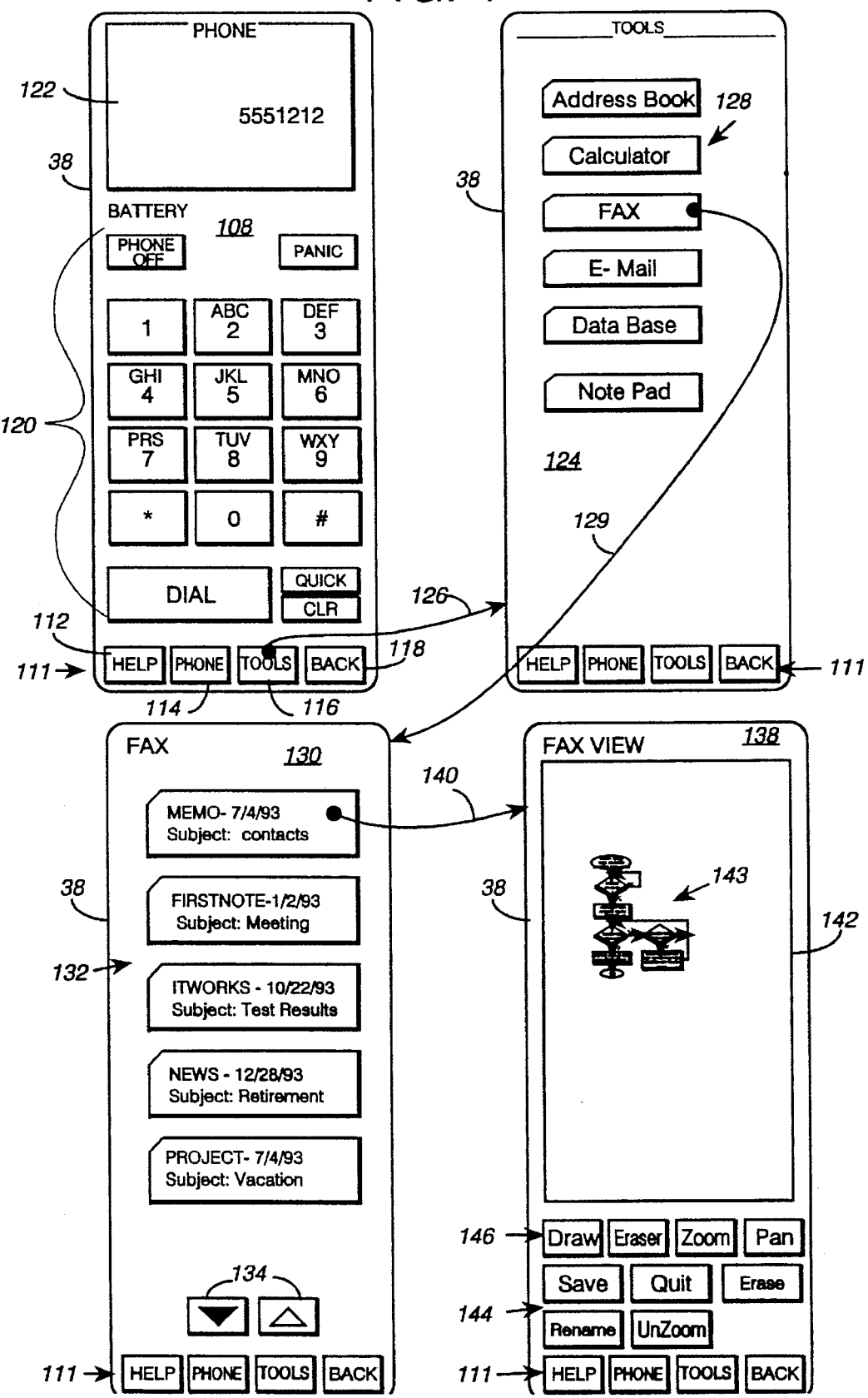
FIG. 4 is a illustration of a sequence of screens, beginning with the first screen that appears when the PC is turned on, showing how to get into zoom and pan functions.

As indicated above, when PC 10 is turned on, DOS 79 and Navigator 80 are loaded into main memory 68, along with an application. By default, the first application to be loaded is a phone application that provides and controls cellular phone operations. Such application is executed and interacts with the Navigator program to create a Phone screen 108 on LCD 38, which screen is shown in FIG. 4. The various screens displayed on LCD 38 are painted by Navigator 80 using information from the specific application program to which the screen is relevant.

The screens include selectable buttons having thin solid lines along their left and top edges and shadow lines along their bottom and right edges. The buttons also bear labels or icons, or both. A button is selected by a touch and release action. That is, a button is selected when the user touches overlay 28 in the area overlaying the button, and then releases the button by releasing the overlay. When a button is so touched, it is highlighted. When a button is so selected, the system sounds beeper 94 to provide audio feedback to the user. All buttons are also operated by a "last contact" method to that a user can easily recover from touching an unintended button by leaving a finger on the screen and sliding to another button or a non-button area. As a finger is slid across the overlay, new buttons are highlighted while the old buttons are returned to normal, non-highlighted conditions, thereby providing the user with visual feedback as to which button will be selected when the finger is removed from the overlay. Each application program stores one or more maps correlating the X, Y positions of the overlay with the different buttons and applications. The Navigator scans the map, in response to receiving X, Y coordinates, to determine the function of a selected area or button, and take appropriate action.

Screen 108 includes a simulated cellular phone keyboard 120 and a data entry area 122 in which phone numbers are displayed as the respective digits of a phone number are entered by the keyboard. Screen 108 also comprises a row 111 of selectable buttons including a HELP button 112, a PHONE button 114, a TOOLS button 116, and a BACK button 118, located along the bottom edge of the screen. These four selectable buttons are common to other menu screens and appear at the same locations on screen 110 and other portrait screens. PHONE button 114 is used to transfer control to the phone application from other applications, to allow the user to place or receive a phone call regardless of the current application. TOOLS button 116 is used to transfer control to an office tools screen allowing the user to select another application. BACK button 118 is used to transfer control back to the previously selected screen(s).

When TOOLS button 116 of screen 108 is selected, the Navigator then paints a Tools screen 124, where arrow 126 represents switching from Phone screen 108 to Tools screen 124. Tools screen 124 displays a plurality of selectable buttons 128 that allow-a user to select an application from a menu of different applications such as an address book, a calculator, a FAX, E-mail, data base services, and a note pad. When the FAX button is selected, the Navigator switches to the Fax application via arrow 129, and a FAX screen 130 is painted on display 38.

FAX screen 130 displays a plurality of selectable buttons 132 that form a list of different fax files stored in the system. Buttons 134 are for the purpose of scrolling down and up in the list. Row 111 of the common buttons, is displayed at the bottom of screen 130. In response to the selection of one of buttons 132, the Navigator switches, at 140, to a FAX VIEW screen 138 having a view area 142 within which the first page of the selected fax file, is displayed. Displayed at the bottom of screen 138, beneath view area, are: a row 111 of common bottoms; two rows 144 of buttons for selecting functions of Save, Quit, Erase, Rename, and UnZoom; and a row 146 of tool buttons Draw, Eraser, Zoom, and Pan.

Figure 5:
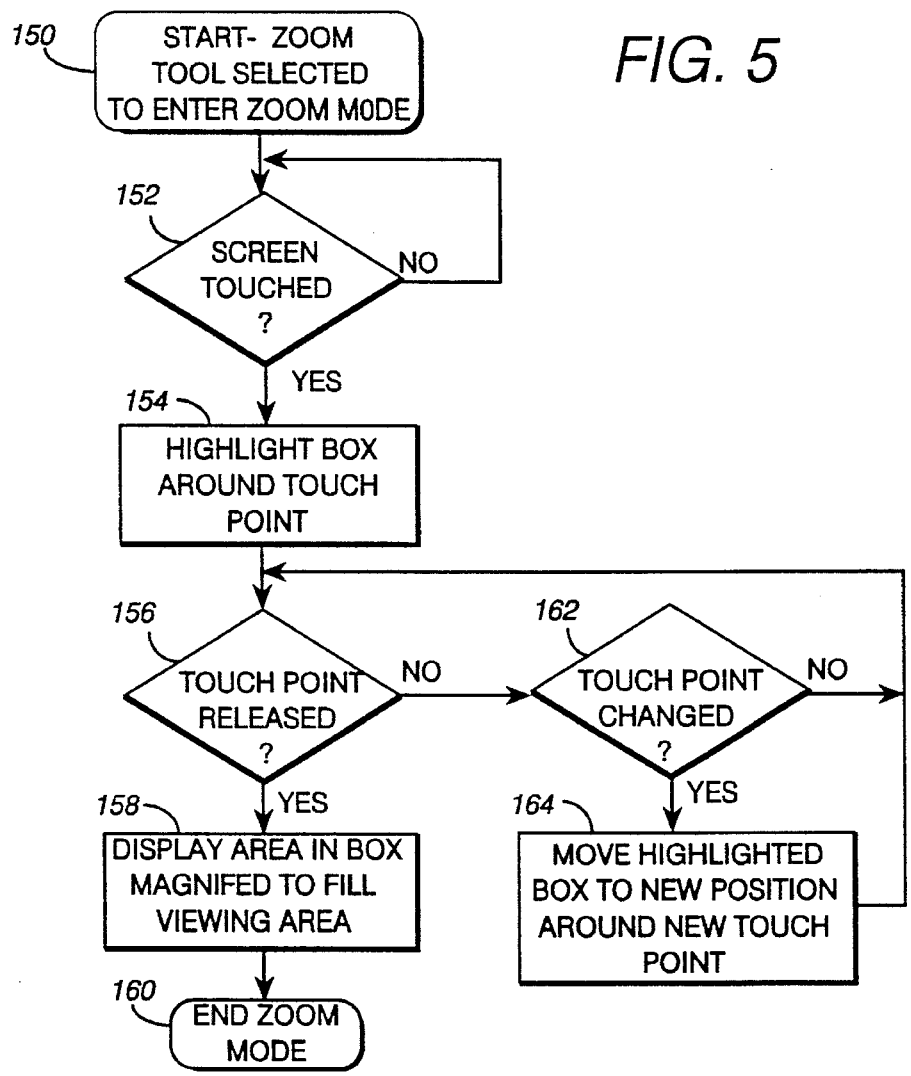
FIG. 5 is a flow chart of the zoom function.

By way of example, suppose a fax file named DIAGRAM contains an image of a flow chart similar to FIG. 5 of the drawings herein. In response to selecting the button 132 with the name DIAGRAM therein, the Navigator and fax application cause the illustrated image 143 to appear in the viewing area 142 of FAX VIEW screen 138. The initial image 143 represents the full, first page of the file with no magnification. Quite obviously, the image, in this example, is so small that details thereof are not perceivable by a user. The zoom and pan functions described below allow the user to magnify the image and shift it around, as desired.

Figure 6:
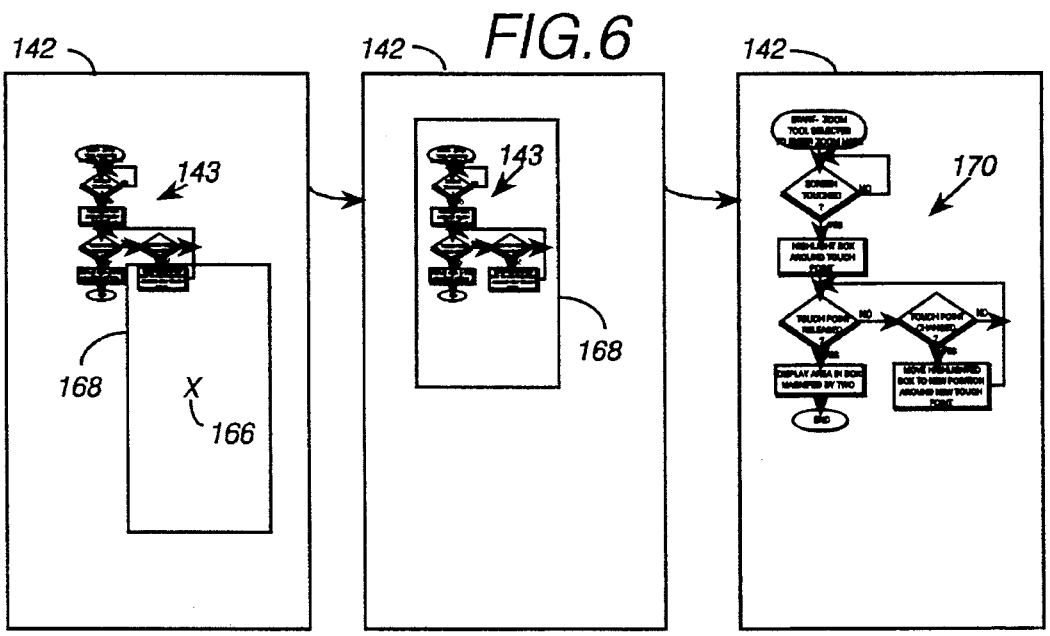
FIG. 6 is a diagram of different screens illustrating the zoom function.

The zoom function is initiated or started when the user selects the Zoom tool 146 at the bottom of screen 138. With reference to FIGS. 5 and 6, when the Zoom tool is selected, a zoom mode of operation is begun at 150. Initially, a decision 152 is made as to whether or not, the touchscreen is being touched. If not, a loop is made until the user touches the screen at a touch point, whereupon a rectangular highlighted box 168 is drawn with the touch point being within the borders. Box 168 delineates the area of viewing screen 142, which is to be zoomed or magnified. Preferably, the shape of box 168 is similar to but smaller than the shape of viewing area 142. Next, a decision is made at 156 whether or not the touch point has been released. If not, a loop is entered with decision 162 and continues until the loop is broken the releasing the touch point, such as by removing the user's finger from the display, whereupon step 158 displays the portion of the image within box 168 to fill the viewing area with an enlarged image 170 having the same aspect ratio. At that point, the zoom mode ends and a return is made at 160 to the normal pan view screen, which at that point continues to display image 170. If further magnification is desired, the user can repeat the process. Decision 162 determines if the touch point has changed which would be caused by sliding the finger over the display to a new position. If a change occurs, step 164 moves the highlighted box to a new position around the new touch point. The loop is traversed as the user moves the touch point, until the finger is removed from contact with the touchscreen display. In this manner, the user is able to select the specific area desired to be magnified.

Relative to the exemplary series of screens shown in FIG. 6, the size of box 168 relative to the size of view area 142 produces a magnification of two. Obviously, other ratios can be used. If the user touches the center of the view area, the box 168 is centered on the point of touch. But if the user touches the view area near an edge of the view area, the box is shown in full and would not be centered at the point of touch. Beginning with the left screen in FIG. 6, the user touches the screen at point 166, and box 168 is drawn. The box initially may not fully surround, diagram 143. Then, the user moves the finger until box 168 contains image 143, as shown in the center screen. Upon removal of the finger, the view area is filled with a magnified image 170.

Figure 7:
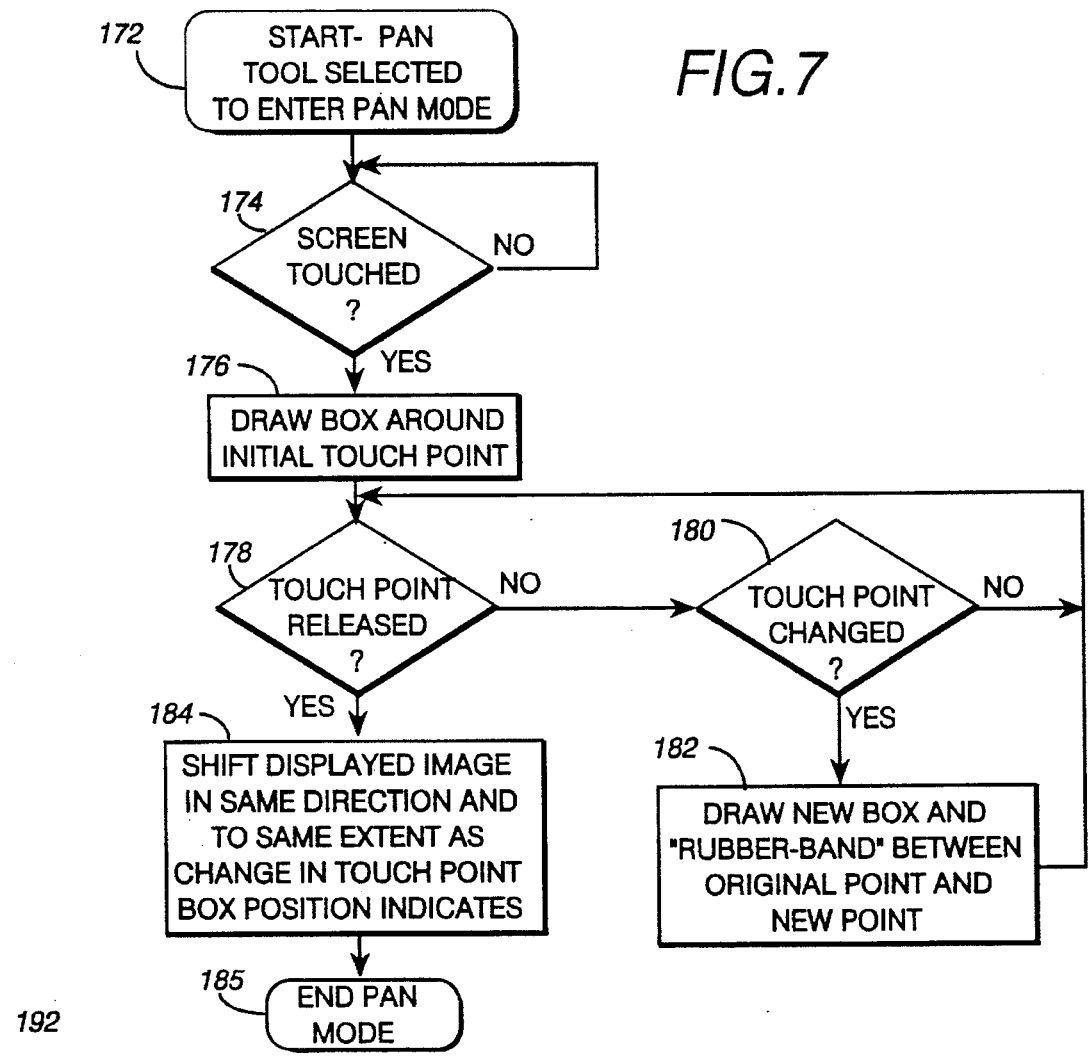
FIG. 7 is a flow chart of the pan function.
Figure 8:
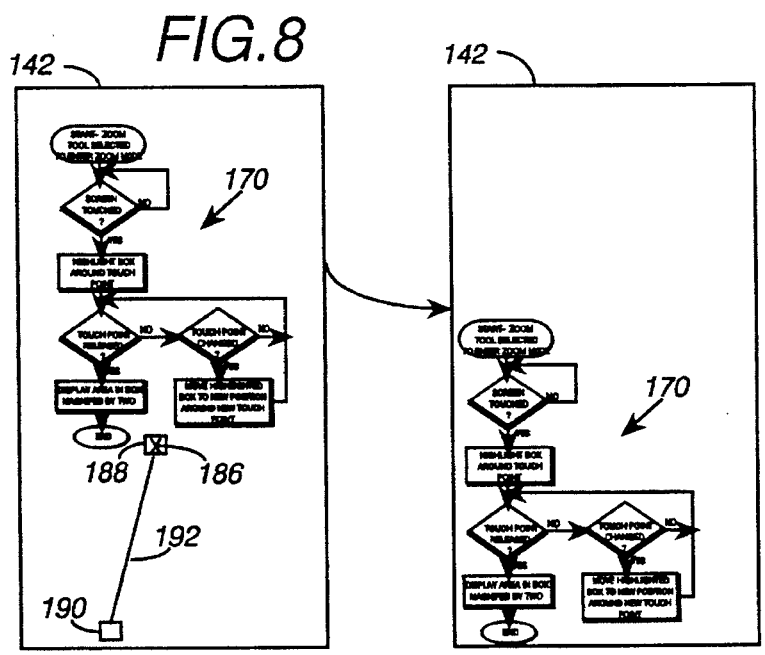
FIG. 8 is a diagram of different screens illustrating the pan function.

The pan function is initiated or started when the user selects the Pan tool 146 at the bottom of screen 138. With reference to FIGS. 7 and 8, when the Pan tool is selected, a pan mode of operation is begun at 172. Initially, a decision 174 is made as to whether or not, the touchscreen is being touched. If not, a loop is made until the user touches the screen at a touch point such as at point 186, whereupon a small rectangular box 188 is drawn with the initial touch point being within the borders of the initial box 188. A loop is formed with decision 180 being made in response to a negative decision out of 178. Decision 180 decides if the touch point position has changed. If so, a new box 190 is drawn and is connected to box 188 by a rubber-band 192. As the finger is slid around the view area, box 190 is constantly redrawn beneath the finger, and the rubber-band is constantly redrawn to give the appearance of stretching and contracting. The finger is moved in the direction and to the same extent that the user wants to shift or move the image. Upon release of the screen, decision 178 passes control to step 184 which, in response to releasing the screen, points or redraws the image 170 in a position that is displaced from the initial position in the same direction and to the same extent as the displacement of box 190, at the time of release, from initial box 188. The process can be repeated to shift the image to a new position. It may be that portions of the initial image are lost when shifted outside the view area, and/or that new image portions come into view. The combination of the pan function with the zoom function allows a user to readily view different portions of a full page of fax material on the small display.

As should be apparent to those skilled in the art, the programs are stored as electrical signals in the different memories. The term "processing means" as used in the claims encompasses not only memories which store the programmed signals but also the different components, including the microprocessor, which operate in response to the programmed signals, to execute the different processing functions and operations described above. It should also be apparent to those skilled in the art that many changes can be made in the details and arrangements of steps and parts without departing from the scope of the invention as defined in the appended claims.

What is claimed is:

1. A personal communicator comprising:

a casing having a size adapted to be held in the hand of a user;

a touch sensitive display mounted on said casing;

first means for displaying a graphics image on said display;

second means for displaying a magnification frame of predefined size and shape on said display and imposed on said graphics image in response to a user touching said display at a touch point with a finger, said frame being located beneath said touch point and delineating the actual portion of said graphics image to be magnified;

third means for moving said frame around said display in response to sliding said finger around said display and in contact therewith; and fourth means for magnifying and displaying on said display said portion of said graphics image delineated by said frame, in response to disengaging said finger from said display.

2. A personal communicator in accordance with claim 1 wherein said second means is selectively actuated, and said communicator further comprises selectively actuated fifth means for panning said graphics image in response to said user touching said display with a finger at one point and sliding the finger to another point thereby indicating direction and extent of panning.

3. A personal communicator in accordance with claim 2 wherein said fifth means comprises:

sixth means for drawing a symbol on said display indicating where the user initially touched said display and for continuously displaying a second symbol beneath the finger as the finger slides to other positions; and seventh means for redrawing said graphics image in a new position in response to a release of said display at said second symbol.

4. A personal communicator comprising:

an elongated casing of a size adapted to be held in the hand of a user;

a cellular phone mounted in said casing and including a speaker mounted adjacent one end of said casing and a microphone mounted adjacent another end of said casing;

a touchscreen display mounted on said casing and having a rectangular shape elongated in a direction similar to said casing, said touchscreen display forming a user interface for entering information into and outputting information from said communicator, said touchscreen display comprising a pressure sensitive overlay coupled with a liquid crystal display (LCD) for displaying different screens of information;

processing means mounted in said casing, said processing means being connected to said touchscreen display for receiving information entered through said overlay and outputting information on said LCD, said processing means comprising screen management means for painting different screens on said LCD, said processing means having a plurality of modes of operation including a zoom mode;

storage means for storing graphics image files;

said screen management means comprising first means for painting on said LCD a first screen having a plurality of selectable buttons listing said graphics image files;

second means for painting on said LCD a second screen in response to a user selecting one of said selectable buttons, said second screen having a view area displaying a graphics image from a selected one of said graphics image files, and a selectively actuated Zoom tool button;

third means for switching operation to said zoom mode and displaying a magnification frame of predefined size and shape in said second screen and imposed on said graphics image in response to a user touching said overlay at a touch point with a finger, said frame being located beneath said touch point and delineating the actual portion of said graphics image to be magnified;

fourth means operative in said zoom mode for moving said frame around said screen in response to sliding said finger around said overlay and in contact therewith; and fifth means operative in said zoom mode for magnifying and displaying said portion of said graphics image delineated by said frame, in response to disengaging said finger from said overlay.

5. A personal communicator in accordance with claim 4 wherein said frame and said view area have similar shapes, said frame having a size smaller than that of said view area and providing a predetermined magnification ratio.

6. A personal communicator in accordance with claim 5 wherein said frame and said view area have rectangular shapes, said frame being displayed on said LCD beneath the point on said overlay touched by the finger.

7. A personal communicator in accordance with claim 6 wherein said second screen further includes a selectively actuated Pan tool;

said processing means further having a pan mode of operation; and said screen management means further comprises sixth means for switching operation to said pan mode and displaying a first symbol indicating an initial point of finger contact with said overlay, in response to a user actuating said Pan tool.

8. A personal communicator in accordance with claim 7 wherein said screen management means further comprises seventh means for displaying a second symbol at a second point on said LCD in a position displaced from said first symbol in a direction and a displacement from said initial point determined by movement of the finger on said overlay.

9. A personal communicator in accordance with claim 8 wherein said screen management means further comprises eighth means for redrawing said graphics image in a position displaced by an amount and direction determined from positions of said symbols.

* * * * *